United States Patent
Kalavsky et al.

(10) Patent No.: US 11,876,432 B2
(45) Date of Patent: Jan. 16, 2024

(54) ROTOR CORE, PERMANENT MAGNET ROTOR, ELECTRIC MOTOR AND ELECTRIC PUMP FOR A HOUSEHOLD APPLIANCE

(71) Applicant: BSH Hausgeraete GmbH, Munich (DE)

(72) Inventors: Michal Kalavsky, Kosice (SK); Stephan Lutz, Zusamaltheim (DE); Hans-Holger Pertermann, Dresden (DE)

(73) Assignee: BSH Hausgeraete GmbH, Munich (DE)

( * ) Notice: Subject to any disclaimer, the term of this patent is extended or adjusted under 35 U.S.C. 154(b) by 74 days.

(21) Appl. No.: 17/479,117

(22) Filed: Sep. 20, 2021

(65) Prior Publication Data
US 2022/0131443 A1  Apr. 28, 2022

(30) Foreign Application Priority Data

Oct. 27, 2020  (EP) ..................... 20204135

(51) Int. Cl.
| | |
|---|---|
| *H02K 9/06* | (2006.01) |
| *H02K 1/27* | (2022.01) |
| *H02K 1/28* | (2006.01) |
| *H02K 1/276* | (2022.01) |
| *H02K 7/14* | (2006.01) |

(52) U.S. Cl.
CPC .............. *H02K 9/06* (2013.01); *H02K 1/276* (2013.01); *H02K 1/28* (2013.01); *H02K 7/14* (2013.01)

(58) Field of Classification Search
CPC ............ H02K 9/06; H02K 1/276; H02K 1/28; H02K 7/14; H02K 7/003; H02K 1/2733; H02K 1/274; F04D 13/06
See application file for complete search history.

(56) References Cited

U.S. PATENT DOCUMENTS

| | | | |
|---|---|---|---|
| 7,768,168 B2 * | 8/2010 | Aschoff | H02K 1/2733 310/156.16 |
| 2007/0069841 A1 * | 3/2007 | Kusano | H02K 5/128 335/202 |
| 2016/0149449 A1 * | 5/2016 | Ivanak | F04D 13/064 310/156.13 |
| 2020/0313476 A1 | 10/2020 | Kalavsky | |
| 2021/0159746 A1 | 5/2021 | Kalavsky | |

FOREIGN PATENT DOCUMENTS

| | | |
|---|---|---|
| DE | 102017223256 A1 | 6/2019 |
| DE | 102018208820 A1 | 12/2019 |

* cited by examiner

*Primary Examiner* — Thomas Truong
(74) *Attorney, Agent, or Firm* — Laurence A. Greenberg; Werner H. Stemer; Ralph E. Locher

(57) ABSTRACT

A rotor core includes a hollow shaft and a carrier portion permanently combined with the hollow shaft and configured to carry a ring-shaped permanent magnet coaxially to the hollow shaft. The carrier portion includes a support plate extending in radial direction and at least one axial support region configured to support the ring-shaped permanent magnet in axial direction. The carrier portion further includes at least one support element configured to extend into an interior space surrounded by the ring-shaped permanent magnet. A permanent magnet rotor including the rotor core, an electric motor, an electric pump and a household appliance, are also provided.

10 Claims, 2 Drawing Sheets

ROTOR CORE, PERMANENT MAGNET ROTOR, ELECTRIC MOTOR AND ELECTRIC PUMP FOR A HOUSEHOLD APPLIANCE

CROSS-REFERENCE TO RELATED APPLICATION

This application claims the priority, under 35 U.S.C. § 119, of European Patent Application EP 20204135.6, filed Oct. 27, 2020; the prior application is herewith incorporated by reference in its entirety.

FIELD AND BACKGROUND OF THE INVENTION

The present invention relates to a rotor core for a permanent magnet rotor of a household appliance. The invention further relates to a permanent magnet rotor with such a rotor core, an electric motor with such a permanent magnet rotor, and an electric pump and a household appliance including such an electric motor.

Electric household appliances usually include an electric motor which in particular may be configured to drive a rotatable tool or an impeller of a pump. Different types of rotors included in the corresponding electric motors are known.

In particular, in German Patent Application DE 10 2017 223 256 A1, an electric motor with a permanent magnet rotor including a carrier for a permanent magnet is disclosed, wherein the carrier is cup-shaped with a circular bottom and a cylindrical lateral surface having an at least almost identical thickness, and wherein a permanent magnet is disposed at an outer circumference of the lateral surface.

German Patent Application DE 10 2018 208 820 A1 discloses an electric motor including a rotor with a permanent magnet and a rotor core with a shaft and a carrier, the permanent magnet being disposed on an outer circumference of the carrier. The rotor core provided therein is a single piece formed by forming a sole metal sheet. The shaft may be hollow to serve as a flow channel for liquid for cooling of the electric motor and for providing an improved utilization of space.

SUMMARY OF THE INVENTION

It is accordingly an object of the invention to provide a rotor core, a permanent magnet rotor, an electric motor and an electric pump for a household appliance, which overcome the hereinafore-mentioned disadvantages of the heretofore-known devices of this general type and which provide a technique facilitating an improved permanent magnet rotor of a household appliance.

With the foregoing and other objects in view there is provided, in accordance with the invention, a rotor core for a permanent magnet rotor of a household appliance, the rotor core comprising a hollow shaft and, permanently combined therewith, a carrier portion configured to carry a ring-shaped permanent magnet coaxially to the hollow shaft, wherein the carrier portion includes a support plate extending in radial direction and including at least one axial support region configured to support the ring-shaped permanent magnet in axial direction and one or more support element/s configured to extend into an interior space surrounded by the ring-shaped permanent magnet.

Advantageous embodiments are disclosed in the dependent claims, the description and the figures.

A rotor core according to the present invention is a component included or to be included in a permanent magnet rotor of a household appliance. The permanent magnet rotor may in particular form part of a pump, such as a water pump. According to particular embodiments, the household appliance may be a water-carrying appliance such as a dishwasher, a washing machine or a laundry dryer.

The rotor core includes a hollow shaft and a carrier portion for carrying (in particular, holding) a ring-shaped permanent magnet coaxially to the hollow shaft. The carrier portion (which in particular may serve as a hub) is permanently combined with the hollow shaft. In the following, the attribute "hollow" to the shaft and the attribute "ring-shaped" to the permanent magnet are sometimes omitted to simplify the text.

The carrier portion includes a support plate and one or more support elements. The support plate extends in radial direction and includes at least one region configured to support (thus, to retain) the ring-shaped permanent magnet in axial direction. In the following, those regions are referred to also as "axial support regions." As is to be noted, in this document, the expressions "radial direction" and "axial direction" as well as (below) "circumferential direction" each relate to a designated axis of rotation of the permanent magnet rotor, which axis of rotation coincides with a longitudinal center axis of the hollow shaft.

The one or more support element/s are configured to extend into an interior space surrounded by the ring-shaped permanent magnet (when combined therewith). In particular, the support element/s may extend in axial direction at a distance from the designated rotation axis which is smaller than a distance which the radially outmost point of the at least one axial support region may have from the designated rotation axis.

The rotor core according to the present invention thus allows for a simplified and material saving production. Due to the support of the permanent magnet both in radial and in axial direction (by using the support element/s and the axial support region/s, respectively) a particularly solid construction of a permanent magnet rotor including the rotor core, which is rigid against vibrations and rotor rattling, is ensured. Moreover, the present invention provides for a particularly compact rotor core having a low tolerance range. Therefore, an electric motor including the rotor core may be constructed both particularly space-saving and stable.

Advantageously, the carrier portion may be a monolithic element, wherein the one or more support element/s is/are bent from the support plate. In particular, the carrier portion may be formed of a single metal sheet. According to preferred embodiments, the support plate is entirely or at least partially plane or planar. In particular, the axial support region/s is/are preferably flat. Preferably, the rotor core is rigid.

The carrier portion and/or the hollow shaft may in particular at least partially be made of steel and/or stainless steel, the latter material being in particular advantageous for water-carrying household applications.

According to advantageous embodiments, the carrier portion includes at least two support elements which are evenly distributed in circumferential direction. Thereby, a particularly durable clamp for the ring-shaped permanent magnet may be formed. Additionally, or alternatively, the support plate of the carrier portion may include at least two axial support regions being evenly distributed in circumferential direction. In particular, the carrier portion may be rotationally symmetrical with respect to some rotation, such as a rotation about 90° and/or 120°.

Preferably, the carrier portion includes as many support elements as axial support regions.

At least one hole may preferably be formed in the support plate. Thereby, a fluid may be allowed to pass through the support plate. In particular, a radial sleeve bearing possibly combined, in an electric motor, with the hollow shaft may be wetted, lubricated and/or cooled by liquid passing through the at least one hole. Thereby, the durability of the permanent magnet rotor may be increased.

The hollow shaft may in particular form a pipe, thus forming a duct from a first end to a second end in longitudinal direction of the shaft. According to advantageous embodiments, the hollow shaft of the rotor core passes through the support plate. In particular, the hollow shaft may thus allow a fluid (such as water) to flow from a support plate's side opposite to the permanent magnet (when mounted) through the hollow shaft (in a longitudinal direction thereof). In this way, the rotor core may form part of a cooling flow system which may be included in an electric motor having a permanent magnet rotor including the rotor core.

The permanent combination of the hollow shaft and the carrier portion may in particular result from a production by additive manufacturing. According to preferred embodiments, the carrier portion is welded to the hollow shaft.

A permanent magnet rotor according to the present invention is provided for use in a household appliance. According to particular embodiments, the household appliance may be a dry or a wet appliance, in particular a water-carrying appliance such as a dishwasher, a washing machine or a laundry dryer. The permanent magnet rotor may in particular form part of an electric pump, such as an electric water pump.

With the objects of the invention in view, there is also provided a permanent magnet rotor which comprises a rotor core according to an embodiment of the present invention. Furthermore, the permanent magnet rotor includes a ring-shaped permanent magnet combined (in a designated manner) with the rotor core. In particular, the ring-shaped permanent magnet is carried, by the carrier portion of the rotor core, coaxially to the hollow shaft. The at least one axial support region of the support plate of the carrier portion of the rotor core thus supports (preferably by butting against) the ring-shaped permanent magnet in axial direction, wherein the one or more support elements extend into an interior space surrounded by the ring-shaped permanent magnet, thus supporting the permanent magnet in radial direction (preferably by butting against it).

According to advantageous embodiments, the permanent magnet rotor further includes a hull, which may at least partially cover the permanent magnet and/or which may at least partially be made of plastic. The hull may provide or at least reinforce a fixation of the permanent magnet to the rotor core. It may embed (in particular encase) at least a portion of the carrier portion, such as the support elements and/or the axial support region/s thereof.

With the objects of the invention in view, there is furthermore provided an electric motor configured to be installed in a household appliance, which may be dry or wet, for example in a water-carrying household appliance such as a dishwasher, a washing machine or a laundry dryer. The electric motor includes a (preferably wound) stator and a permanent magnet rotor according to an embodiment of the present invention.

Preferably, the permanent magnet rotor is rotatably disposed in the electric motor by using a sleeve bearing which the hollow shaft of the rotor core may penetrate; in particular, the electric motor may include a sole (i.e., exactly one) such sleeve bearing.

The electric motor may include a cup-shaped rotor frame having a (preferably cylindrical) side wall which may separate the permanent magnet rotor from the stator. Thereby, a rotor chamber may be formed. Such a rotor chamber may be covered by an end shield. In embodiments further including a sleeve bearing as mentioned above, such an end shield may include a fixation support for the sleeve bearing of the hollow shaft. Thereby, the permanent magnet rotor can be rotatably mounted in the electric motor. The cup-shaped rotor frame and/or the end shield may be at least partially made of plastic.

With the objects of the invention in view, there is additionally provided an electric pump configured to be installed in a household appliance, which may be a dry or a wet appliance, in particular a water-carrying household appliance, such as a dishwasher, a washing machine or a laundry dryer. The electric pump comprises an electric motor according to an embodiment of the present invention. Moreover, the electric pump includes a pump casing delimiting a pump chamber, and an impeller configured to be rotated, in the pump chamber, by the electric motor.

In particular, with the electric motor, the electric pump thus includes a permanent magnet rotor comprising a rotor core according to the present invention. At its end opposite to the carrier portion, the hollow shaft of the rotor core may be fixed to the impeller of the electric pump. Preferably, such fixation implements a passage through the impeller and into the hollow shaft. Thereby, water may be enabled to flow from the impeller around a periphery of the permanent magnet and, thereafter, through the hollow shaft back to and through the impeller, thus providing a cooling circulation for the electric motor. Different pressure zones may be disposed in the electric pump to ensure the water flow while the pump is operating. Thereby, an improved heat transfer from a sliding surface of an axial and radial bearing to the rotor may be achieved. Moreover, electric losses of the wound stator and mechanical losses of the bearing system may be recovered by using the heat transfer to water circulating in the appliance.

With the objects of the invention in view, there is concomitantly provided a household appliance which comprises an electric motor according to an embodiment of the present invention. The household appliance may in particular be a water-carrying appliance. It may thus include a dishwasher, a washing machine and/or a laundry dryer. In particular, the household appliance may include an electric pump according to an embodiment of the present invention.

In the following, preferred embodiments of the present invention are explained with respect to the accompanying drawings. As is to be understood, the various elements and components are depicted as examples only, may be facultative and/or combined in a manner different than that depicted. Reference signs for related elements are used comprehensively and are not always defined again for each figure.

Other features which are considered as characteristic for the invention are set forth in the appended claims.

Although the invention is illustrated and described herein as embodied in a rotor core, a permanent magnet rotor, an electric motor and an electric pump for a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
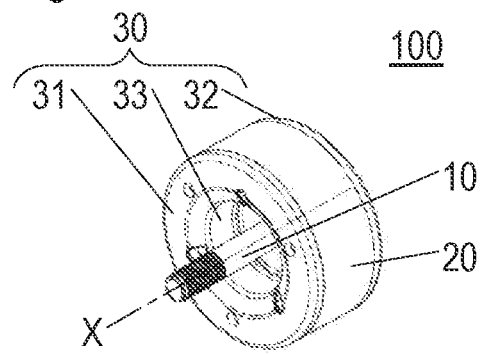
FIG. 1A is a diagrammatic, perspective view of a permanent magnet rotor according to an exemplary embodiment of the present invention.

Referring now to the figures of the drawings in detail and first, particularly, to FIG. 1A thereof, there is seen an exemplary embodiment of a permanent magnet rotor 100 according to the present invention, which is shown in a perspective view. The permanent magnet rotor 100 is configured to rotate, when used, around a rotation axis X.

The permanent magnet rotor 100 includes an exemplary embodiment of a rotor core 10 according to the present invention (further described below with respect to FIGS. 2A-2D), a ring-shaped permanent magnet 20 and a hull 30 including a first ring-shaped shield 31, a second ring-shaped shield 32 and a cylindrical center 33, each disposed coaxially to the rotation axis. The cylindrical center 33 connects the first shield 31 and the second shield 32. Thereby, the ring-shaped permanent magnet is covered at both base sides in axial direction and further in radial direction at its inner surface. As mentioned above, the terms "axial direction" and "radial direction" as well as "circumferential direction" in this document refer to the designated rotation axis X of the permanent magnet rotor 100.

Figure 1B:
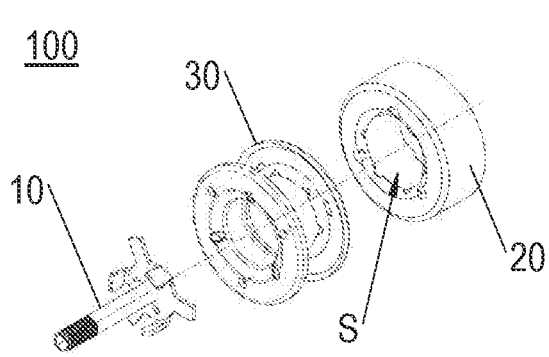
FIG. 1B is an exploded, perspective view of components of the permanent magnet rotor of FIG. 1A.

In FIG. 1B, the rotor core 10, the ring-shaped permanent magnet 20 surrounding an interior space S and the hull 30 are seen in an exploded view.

Figure 1C:
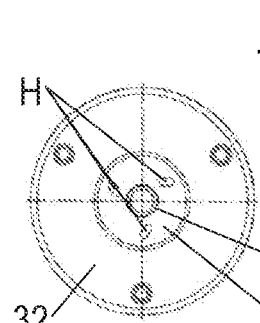
FIG. 1C is a side-elevational view of the permanent magnet rotor of FIG. 1A as seen in axial direction from a first side.
Figure 1D:
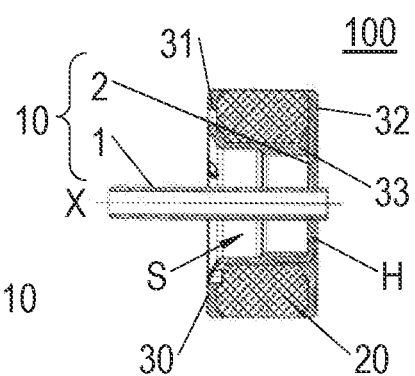
FIG. 1D is a cross-sectional view of the permanent magnet rotor of FIG. 1A taken along a designated rotation axis.
Figure 1E:
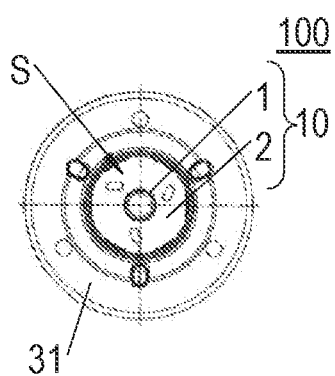
FIG. 1E is a side-elevational view of the permanent magnet rotor of FIG. 1A as seen in axial direction from a second side which is opposite to the first side.

In FIGS. 1C and 1E, the permanent magnet rotor 100 is shown from opposite sides with an axial viewing direction along the designated axis of rotation X, in such a way that a second surface of the second shield 32 is visible in FIG. 1C, and a first surface of the first shield 31 is visible in FIG. 1E.

FIG. 1C thus depicts the second surface of the second shield 32 surrounding a disc shaped region of a carrier portion 2 of the rotor core 10, with the carrier portion 2 being crossed by a hollow shaft 1 of the rotor core 10. As is further indicated in FIGS. 1C to 1E, holes H are formed in the carrier portion 2 of the rotor core. The holes H allow a fluid to flow through the carrier portion 2 into the interior space S surrounded by the ring-shaped permanent magnet 20. Thereby, a radial sleeve bearing the shaft 1, which may be mounted on (see FIGS. 3B, 3C), can be cooled and/or lubricated, which may increase the durability of the bearing system.

As is further seen in the cross section of FIG. 1D, the permanent magnet 20 is supported by the carrier portion 2 of the rotor core 10. Moreover, both ring-shaped base surfaces as well as a cylindrical inner surface of the permanent magnet 20 are at least partially covered by the hull 30, wherein (as is further seen in the cross section of FIG. 1D) the carrier portion 2 is partially embedded in the hull 30. According to preferred embodiments, the hull is (at least partially) made of plastics.

In FIGS. 2A-2D, a rotor core 10 according to an exemplary embodiment of the present invention is shown in more detail. The rotor core 10 includes a hollow shaft 1 and a carrier portion 2 permanently combined with the hollow shaft, such as by welding. The carrier portion 2 of the illustrated exemplary rotor core 10 includes a support plate 2a extending in radial direction and including various (in the present case: three) regions 2a-r, which are configured to support (thus, to retain) the ring-shaped permanent magnet 20 in axial direction. In the example depicted, the support plate 2a is plane (flat).

The carrier portion 2 further includes various (in the present case: three) support elements 2b. As can be seen in FIG. 1D, when the permanent magnet 20 is mounted in a designated manner to the rotor core 10, the support elements 2b each extend into the interior space S surrounded by the ring-shaped permanent magnet 20.

In particular, the carrier portion 2 of the rotor core 10 is a monolithic element, wherein the support elements 2b are bent from the support plate 2a so as to protrude therefrom in axial direction.

For instance, the carrier portion 2 may be formed from a metal sheet. In particular, the metal may be steel or stainless steel.

Figure 2A:
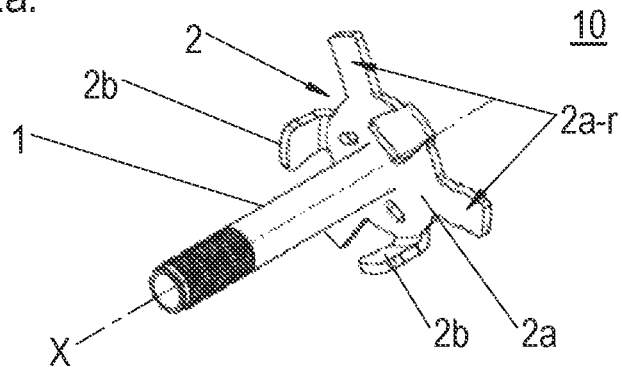
FIG. 2A is a perspective view of a rotor core according to an exemplary embodiment of the present invention.
Figure 2B:
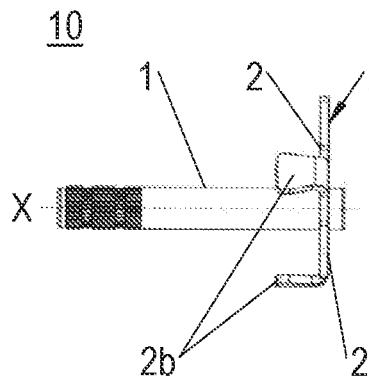
FIG. 2B is a side-elevational view of the rotor core of FIG. 2A with a viewing direction orthogonally to the designated rotation axis.
Figure 2C:
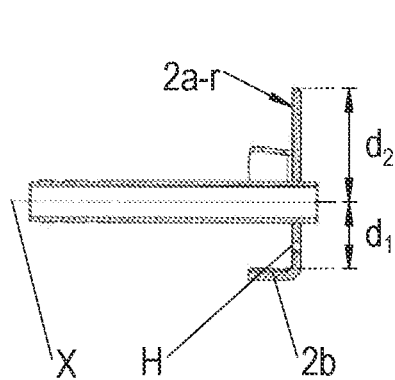
FIG. 2C is a cross-sectional view of the rotor core of FIG. 2A taken along the designated rotation axis.
Figure 2D:
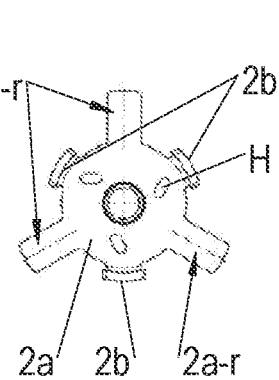
FIG. 2D is an elevational view of the rotor core of FIG. 2A as seen in axial direction.

As is further seen in FIGS. 2A and 2D, the support elements 2b are evenly distributed in circumferential direction, and the same holds for the axial support regions 2a-r. In particular, the carrier portion 2 of the illustrated embodiment has a three-fold rotational symmetry. That is, the carrier portion 2a of the depicted rotor core 10 is rotational symmetric with respect to a rotation about 120°.

In the embodiment depicted, the three regions 2a-r are the radially outmost regions of the support plate 2a. As illustrated in FIG. 2C, the support elements 2b extend in axial direction at a distance $d_1$ from the designated rotation axis X. The distance $d_1$ is smaller than a distance $d_2$ from a radially outermost point of the at least one axial support region 2a-r to the designated rotation axis X.

Figure 3A:
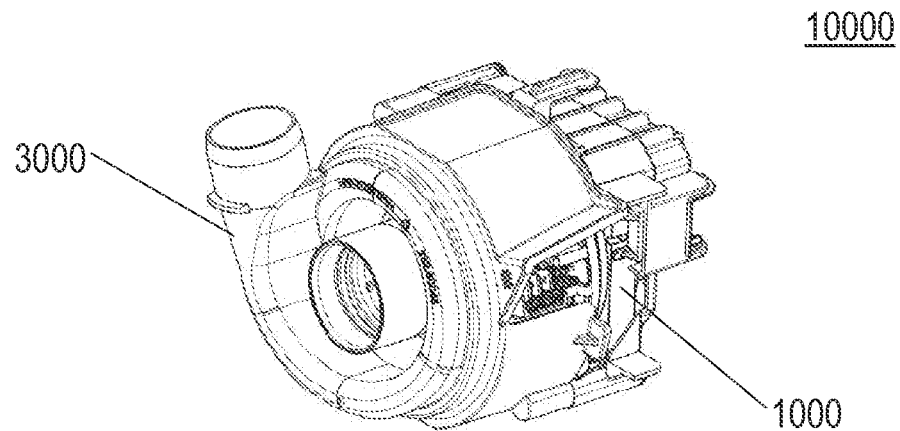
FIG. 3A is a perspective view of an electric pump according to an exemplary embodiment of the present invention.

In FIG. 3A, an electric pump 10000 according to an exemplary embodiment of the present invention is shown in a perspective view. The pump may be configured for use in a dry household application or for use in a wet household application, such as a dishwasher, a washing machine or a laundry dryer. The electric pump 10000 in particular includes a housing 3000 and an electric motor 1000 according to the present invention which is partially inserted in the housing.

Figure 3B:
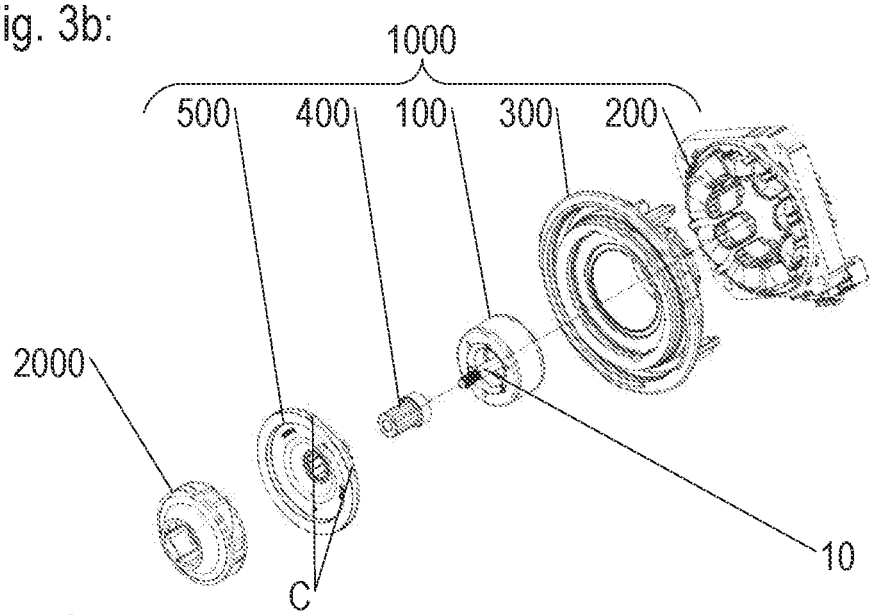
FIG. 3B is an exploded, perspective view of the electric pump of FIG. 3A without a casing.
Figure 3C:
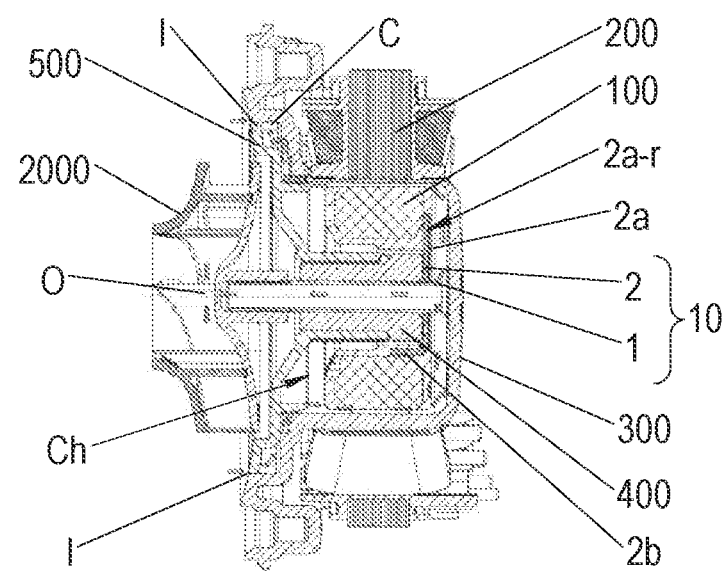
FIG. 3C is a cross-sectional view of the electric pump of FIG. 3A (without its casing) taken along the designated axis of rotation of the rotor, with a possible cooling stream.

FIGS. 3B and 3C show more details of an interior of the electric pump 10000. In particular, the electric motor 1000 includes a (preferably wound) stator 200 and a cup-shaped rotor frame 300 delimiting a rotor chamber Ch containing a permanent magnet rotor 100 according to an embodiment of the present invention. The electric motor 1000 further includes a sleeve bearing 400 and, fixed thereto, an end shield 500 covering the rotor chamber Ch. The shaft 1 of the rotor core 10 is passed through the sleeve bearing 400. An end of the shaft 1 disposed opposite to the support plate 2 is connected to an impeller 2000 further included within the electric pump 10000 and configured to be rotated by using the electric motor 1000.

Canals C are formed in the end shield 500, thus allowing a fluid to intrude from the impeller 2000 side into the rotor chamber Ch. In particular, in wet applications, an inlet I for cooling water may be formed, thus allowing a cooling water stream, as indicated by arrows in FIG. 3C. The cooling water is seen therein to enter the inlet I, to pass a periphery of the ring-shaped permanent magnet 20, to thereafter flow in an interspace between the permanent magnet rotor 100 and a base surface of the cup-shaped rotor frame 300, to then enter the hollow shaft 1, to flow through the shaft 1 and to exit the shaft through the impeller 2000. The flow may result from respective lower and higher pressure zones emerging within the electric pump 10000 during operation thereof. During the flow, the water may in particular be heated by electrical and iron losses in the stator 200 as well as by friction losses in the sleeve bearing 400, which provides for cooling the stator and the sleeve bearing. The heated water may then be transported, by the electric pump, to a convenient utilization region of the household appliance, such as for utilization in a dishwasher or washing machine, for instance.

Therefore, the heat transfer may in particular provide both for cooling the stator 200 and the bearing system (including sleeve bearing 400), and for absorbing and recovering electric losses and iron losses or core losses in the stator 200 as well as mechanical losses in the bearing system.

A rotor core 10 according to the present invention includes a hollow shaft 1 and, permanently combined therewith, a carrier portion 2 configured to carry a ring-shaped permanent magnet 20 coaxially to the hollow shaft 1. The carrier portion 2 includes a support plate 2a extending in radial direction and including at least one axial support region 2a-r configured to support the ring-shaped permanent magnet 20 in axial direction. The carrier portion further includes at least one support element 2b configured to extend into an interior space S surrounded by the ring-shaped permanent magnet 20.

The present invention further concerns a permanent magnet rotor 100 including such rotor core 10, an electric motor 1000, an electric pump 10000 and a household appliance.

The following is a summary list of reference numerals and the corresponding structure used in the above description of the invention:

1 hollow shaft
2 carrier portion
2a support plate
2a-r axial support region of support plate 2a
2b support element
10 rotor core
20 permanent magnet
30 hull
31 ring-shaped first shield of the hull 30
32 ring-shaped second shield of the hull 30
33 cylindrical center of the hull 30
100 permanent magnet rotor
200 stator
300 cup-shaped rotor frame
400 sleeve bearing
500 end shield
1000 electric motor
2000 impeller
3000 pump casing
10000 electric pump
$d_1$ distance of support element 2b to the designated rotation axis X
$d_2$ distance of radially outmost point of region 2a-r to the axis X
C end shield canal
Ch rotor chamber
H hole in the support plate 2a
I water flow inlet
O water flow outlet
S interior space surrounded by the ring-shaped permanent magnet
X designated rotation axis

The invention claimed is:

1. A rotor core for a permanent magnet rotor of a household appliance, the rotor core comprising:
a hollow shaft;
a ring-shaped permanent magnet coaxial to said hollow shaft; and
a monolithic carrier portion formed of a metal sheet being permanently combined with said hollow shaft, said carrier portion carrying said ring-shaped permanent magnet, said carrier portion including a support plate extending in radial direction and said support plate including:
three axial support regions extending in the radial direction, evenly distributed in circumferential direction and configured to support the ring-shaped permanent magnet in axial direction; and
three support elements bent from said support plate to protrude in the axial direction, evenly distributed in the circumferential direction and configured to extend into an interior space surrounded by the ring-shaped permanent magnet;
said axial support regions extending radially further from said hollow shaft than said support elements; and
said axial support regions alternating with said support elements in the circumferential direction.

2. The rotor core according to claim 1, wherein said support plate has at least one hole formed therein.

3. The rotor core according to claim 1, wherein said hollow shaft passes through said support plate.

4. The rotor core according to claim 1, wherein said carrier portion is welded to said hollow shaft.

5. A permanent magnet rotor for a household appliance, the permanent magnet rotor comprising:
a rotor core according to claim 1.

6. An electric motor for a household appliance, the electric motor comprising:
   a permanent magnet rotor according to claim 5; and
   a stator.

7. An electric pump for a household appliance, the electric pump comprising:
   an electric motor according to claim 6;
   a pump casing delimiting a pump chamber; and
   an impeller disposed inside said pump chamber, said impeller configured to be rotated by said electric motor.

8. A household appliance, comprising an electric motor according to claim 6.

9. The rotor core according to claim 1, wherein said support elements are each only bent once at right angles from said carrier portion.

10. The rotor core according to claim 1, wherein said support elements and said support regions all protrude from the same axial cross-sectional plane along said hollow shaft.

* * * * *